(12) United States Patent
Ambs

(10) Patent No.: US 6,230,840 B1
(45) Date of Patent: May 15, 2001

(54) MARINE VIBRATOR

(75) Inventor: Loran D. Ambs, Fulshear, TX (US)

(73) Assignee: Western Atlas International, Inc., Houston, TX (US)

( * ) Notice: Subject to any disclaimer, the term of this patent is extended or adjusted under 35 U.S.C. 154(b) by 0 days.

(21) Appl. No.: 09/173,624

(22) Filed: Oct. 16, 1998

(51) Int. Cl.$^7$ ....................................................... G01V 1/02
(52) U.S. Cl. ............................ 181/113; 181/120; 367/141
(58) Field of Search .................................. 181/113, 120, 181/110; 367/141, 142, 143

(56) References Cited

U.S. PATENT DOCUMENTS 4,885,726 * 12/1989 Myers ................................... 181/120
6,002,648 * 12/1999 Ambs ................................... 181/120

* cited by examiner

Primary Examiner—Khanh Dang

(57) ABSTRACT

A marine vibrator has a hollow body formed of one shell or of two opposed shells defining an inner space therein with vibrator apparatus within the hollow body. At least one shell has a curved shape, and the shell can have a streamlined shape with relatively low hydrodynamic drag. Certain embodiments include one or more exterior control members to facilitate positioning of the vibrator in water. Other than their mating ends, when two shells are used the two shells may be different in shape and volume or they may be identical. In preferred two-shell embodiments, there is a flexible seal between and connecting the two opposed shells. In certain aspects the inner space is filled with gas. A vibrator apparatus in one aspect applies equal and opposite forces to the shells of a two-shell vibrator or to opposed sides of a single shell vibrator.

35 Claims, 4 Drawing Sheets

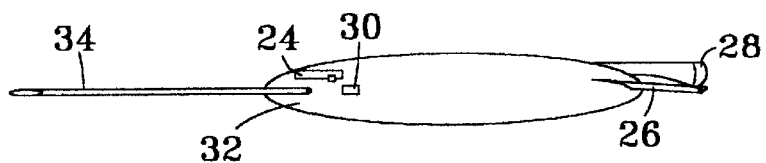
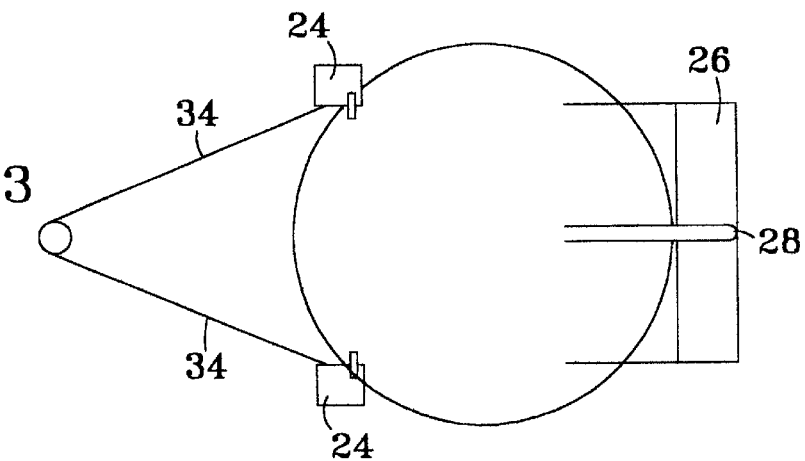
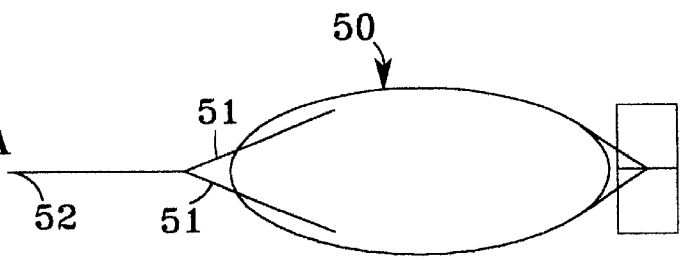
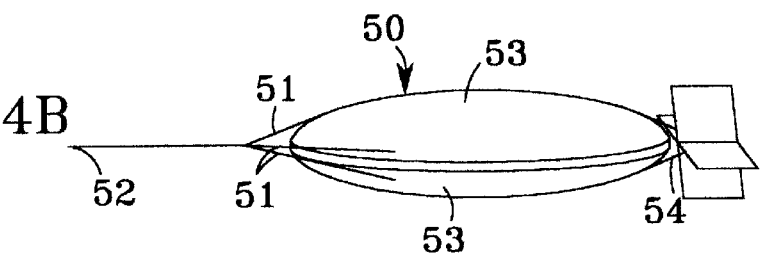
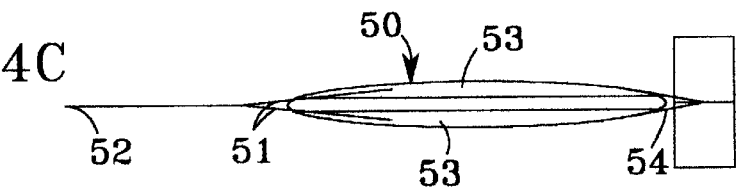

MARINE VIBRATOR

BACKGROUND OF THE INVENTION

1. Field of the Invention

This invention is directed to marine vibrators used in marine seismic systems. In particular, the invention is related to low frequency acoustic sources used in marine seismic surveys.

2. Description of Related Art

The prior art discloses a variety of marine vibrators (or underwater acoustic projectors) used in marine seismic surveys, including but not limited to U.S. Pat. Nos. 3,329,930, 3,384,868, 3,392,369, 3,394,775, 3,482,646, 3, 676, 840, 4,853,905, and 4,885,726. Prior art vibrator devices have a variety of shapes ranging from cylindrical to bell-shaped to spherical. Operationally, these devices are sufficiently heavy so that they do not float and sink of their own accord.

The prior art discloses various underwater acoustic projectors (e.g. as in U.S. Pat. Nos. 3,875,552, 5,247,894 and 5,600,087) used in submarine warfare. These devices are streamlined, generally neutrally buoyant, have control systems which facilitate changing depth, course and speed, and may be remotely controlled or autonomous. They are small in size, operate in a frequency regime much higher than that useful to seismic exploration, and produce relatively low power acoustic signals.

In the marine seismic exploration industry, typical air gun projectors produce high powered acoustic signals (near 200 dB/Hz re $\mu$Pa) in a low frequency band (5 Hz to 120 Hz). Existing prior art marine vibrators do not achieve these power levels in the low end of the seismic spectrum. Several existing prior art units may be used in concert to achieve the desired acoustic power in the seismic frequency band; but simultaneous use of multiple marine vibrator units complicates deployment, towing, synchronization, and operation.

If the acoustic projector is small compared to the wavelength of the signal being produced, the simple source equation (e.g. discussed in *Theoretical Acoustics* by Morse and Ingard, 1968) provides a model for predicting the performance of acoustic projectors. The simple source can be modeled as a sphere having the same surface area as the projector being modeled. It relates the acoustic pressure produced by a projector to the area, frequency and displacement of the projector surface. To produce a high-level acoustic pressure at low frequencies, a projector must have a large surface area which is displaced a relatively large distance.

$$\text{pressure, } p = \frac{\pi \rho f^2 A d}{r}$$

$\rho$=density
f=frequency
A=projector area
d=area displacement
r=observation distance Subsequently, the force required to move the large surface area a large distance is also large:

driving force, $F = 4 \pi^2 \rho f^2 A a d$ where a=radius of equivalent simple source sphere In order for a single submersed marine vibrator to produce high-pressure, low-frequency acoustic signals, the surface area of the projector needs to be very large and the actuator which drives the project is relatively powerful.

Many prior art marine vibrators used in seismic survey operations minimize the enclosed volume of the device which results in strong negative buoyancy. The hydrodynamic drag coefficient of such prior art vibrators is relatively high.

There is a need for an effective and efficient marine vibrator useful in the seismic survey industry that is easily moved through water. Moreover, there is a need for a marine vibrator or an underwater acoustic projector operating in the seismic frequency band that has high power output (>190 dB re $\mu$pa) in the range of frequencies between 5 and 120 Hz, is lightweight to minimize difficulty in deployment and retrieval, is easily towed or pushed through the water, is capable of being steered to change depth and/or lateral position, and is remotely or autonomously controlled.

SUMMARY OF THE PRESENT INVENTION

The present invention, in certain embodiments, discloses a marine vibrator with a hollow hull formed of one or more shells defining an inner space therein, one or more control members on the hull for controlling the position of the marine vibrator in water, and vibrator apparatus within the hollow hull connected to the shell.

In other embodiments, the present invention discloses a marine vibrator with a hollow hull formed of one or more shells having an interior surface and defining an inner space therein and vibrator apparatus within the hollow hull connected directly to the shell.

In certain embodiments, the present invention provides a marine vibrator with a hollow hull formed of one or more shells that define an inner space therein and have a streamlined shape for reducing hydrodynamic drag.

In other embodiments, the present invention provides an autonomous marine vibrator with a hollow hull formed of one or more shells that define an inner space therein, propulsion apparatus for propelling the marine vibrator through water, power apparatus within the hull for providing power to the propulsion apparatus, and vibrator apparatus within the hollow hull connected to the shell.

The present invention, in certain embodiments, discloses a submersible marine vibrator with a hull made of one or two outer shells. In one aspect there are two shells that differ in shape, e.g. two shells with different curvatures or a curved shell and a relatively flat shell. In another aspect there are two matching outer shells, each shell having a relatively flat curved shape, in one aspect defining a spherical segment of one base. In multi-shell embodiments, the edges of shells may be joined by a flexible seal or flexible connector. In embodiments using either two shells or a single shell, one or more stress relief recesses, slots, or slot portions may be used around all or a portion of a shell. In certain aspects for streamlining to reduce hydrodynamic drag, the surfaces of the shell or shells are defined by a radius which is significantly greater than the diameter of a base of the shells.

BRIEF DESCRIPTION OF THE DRAWINGS

FIG. 2 is a side view of the marine vibrator of FIG. 1.

FIG. 3 is a top view of the marine vibrator of FIG. 1.

FIG. 4A is a top view of a marine vibrator according to the present invention. FIG. 4B is a perspective view of the vibrator of FIG. 4A. FIG. 4C is a side view of the vibrator of FIG. 4A.

DESCRIPTION OF EMBODIMENTS PREFERRED

Figure 1:
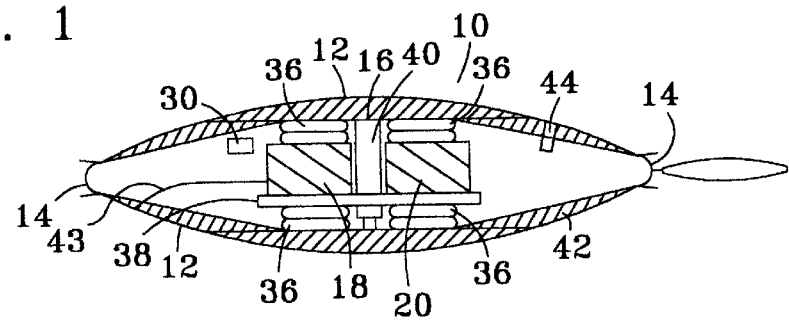
FIG. 1 is a side cross-section view of a marine vibrator according to the present invention.

Referring now to FIGS. 1–3, marine vibrator 10 has two outer shells 12 which are connected together by a flexible member or seal connector 14 to which the shells are attached by glue, sealing compound, and/or bolts. The shells 12 are, optionally, reinforced with steel 42 and, optionally, with I-beams. The reinforced shells define an inner space that is, in one aspect, filled with gas such as air under pressure (e.g. introduced through a valve 44) to compensate for exterior water pressure when the vibrator 10 is submerged. The shells 12 may be made of any suitable material of sufficient strength for use in the intended marine environment, including, but not limited to metal, fiberglass, plastic, and mixtures and combinations thereof.

Vibrator system 16 is positioned within the shells 12 so that equal and opposite force is applied to each shell 12 when the vibrator system 16 is activated. The vibrator system, in certain aspects, includes an electrically driven hydraulic pump 18 and an accumulator 20 mounted on a platform 38. In one aspect marine vibrator 10 is about 0.5 m high and about 3.0 m in diameter. In certain preferred embodiments the height to diameter ratio is less than 1.0 and in other embodiments much less than 1.0, e.g. from about 0.95 to about 0.25 and, in one particular aspect, about 0.5.

The platform 38 is mechanically isolated from the shells 12 by the air springs 36. System 16 is directly connected to and applies an equal force to each of the two shells 12. Unlike several prior art devices, this system does not (in this particular embodiment) use a reaction mass attached to one of the shells, thus reducing overall system weight.

Figure 1A:
FIG. 1A is a side view of a flexible connector of the vibrator of FIG. 1.
Figure 1B:
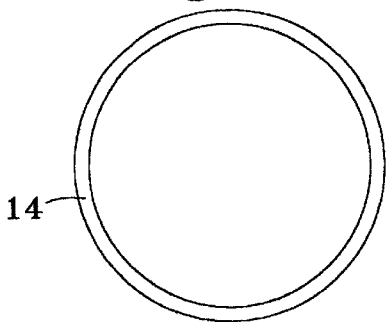
FIG. 1B is a top view of the connector of FIG. 1A.
Figure 1C:
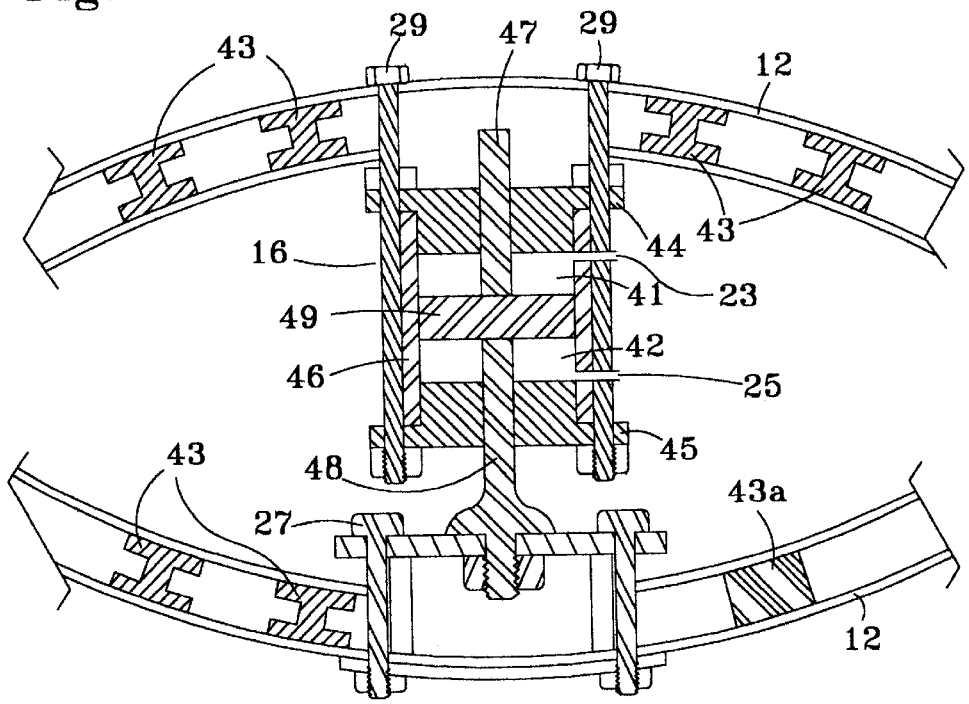
FIG. 1C is a side cross-section view of part of the marine vibrator of FIG. 1 with a pump and accumulator not shown.

FIG. 1C shows one embodiment of a system 16. I-beams 43 reinforce shells 12. Alternatively, some or all of the I-beams 16 may be rotated 90° (e.g. the I-beam labeled 43a). An hydraulic cylinder 46 has within it a single piston 49, with rods 47, 48 protruding from sides of the piston and extending beyond the end caps 44, 45 of the cylinder. The piston operates between an upper and lower chamber of the cylinder. High-pressure hydraulic oil is alternately applied by the pump 18 to opposing cylinder chambers 41, 42 by a servo-valve arrangement to cause the piston to move back and forth. The piston rod 48 is attached to the lower shells 12. The other shell 12 is attached to the cylinder 46 via bolts 29 which extend through the end caps 44, 45. When pressurized oil is applied through port 23 to one of the chambers 41, the shells 12 are moved apart by an equal and opposite force. When pressure is applied to the other chamber 42, the shells 12 are pulled together.

In one aspect the shells 12 (or a single shell in such an embodiment) are very stiff and resist the point loading of the hydraulic actuator. It is within the scope of this invention to employ any number of actuators or actuator types (including other than hydraulic) to achieve the same purpose. A number of smaller hydraulic actuators are employed in other embodiments to apply force at a number of locations distributed within a hull formed by the shells. A phase-lock system similar to that used to lock the phase of multiple land vibrators may be employed to align the phase of multiple hydraulic actuators.

Referring to FIG. 2, electric power can be provided via a line 34 by a tow vessel to the hydraulic pump located in the marine vibrator. It is also possible to have an hydraulic pump on the tow vessel and pressurized oil communicated to the marine vibrator via oil-hoses.

An on-board control system 30 is interconnected with an elevator 26, a rudder 28, and dive planes 24. Lines 34 represent tow lines which may also incorporate power lines (providing power for on-board hydrodynamic control electronics 30, for control surface actuators, or for acoustic actuators) and/or instrumentation/data lines attached at attachment points 32.

FIGS. 4A–4C show a marine vibrator 50 (like the marine vibrator 10) with elliptically shaped shells 53. The marine vibrator 50 has internal structures, mechanisms, and components like those of the marine vibrator 10 described above. Tow lines 51 and 52 are used in towing the marine vibrator 50. An elevator/rudder mechanism 54 facilitates movement in a desired direction.

When the radius of shell curvature in a marine vibrator along the long axis of an ellipse is infinitely large, the shape of the vibrator body formed by the two shells becomes that of a cylinder. If the cylinder length is two or more times the radius of the cylinder, then the cylinder has lower drag (e.g. in certain embodiments a coefficient of drag less than or equal to 0.65) when towed in a direction parallel to its axis (e.g. a coefficient of drag of about 0.9 or less and a projected area of $\pi r^2$) as compared to towing in a direction perpendicular to the axis (with a coefficient of drag of 1.2 and area equal to or greater than 4 times the square of the cylinder's radius). If the cylinder has a length to diameter ratio of 6 or more, and the cylinder (e.g. as in the system 60, FIG. 5) has hemispherical cylindrical end caps (e.g. cap 63, FIG. 5), the coefficient of drag is less than 0.4, e.g. about 0.3.

Figure 5:
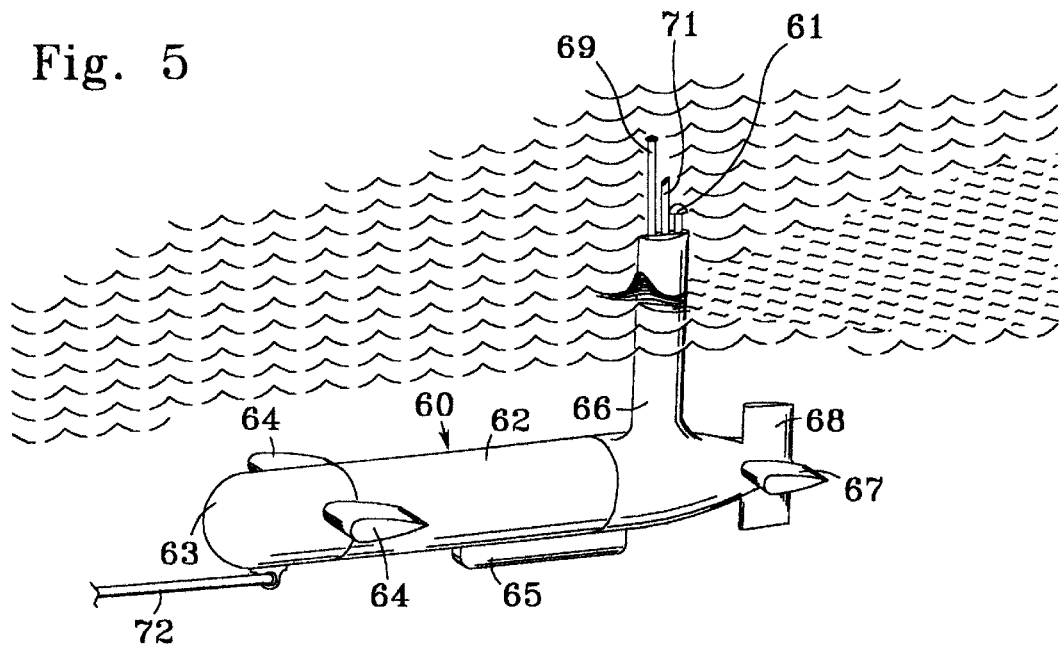
FIG. 5 is a perspective view of a system according to the present invention.

FIG. 5 discloses a marine vibrator system 60 with a cylindrical projector surface 62 having a rounded-nose end cap 63, with diving planes 64; stern planes 67 (one shown) and a rudder 68; a mast 66 with a command and a control communications antenna 69; a GPS antenna 61; and weighted keel 65. In one aspect the system 60 is 20 feet long with a diameter of about 4 feet.

The mast 66 may be articulated to facilitate deployment, retrieval and storage. One mechanism to raise and lower such an arrangement is described in U.S. Pat. No. 3,396,447. The mast 66 provides a stationary platform for satellite navigation via a GPS antenna 61. A rescue beacon 71 is mounted on the mast 66 should the device become separated from a tow vessel. Support of the GPS antenna 61 above the main body facilitates accurate localization of the submersed system which is needed for processing seismic data.

The weighted keel 65 may be releasable from the main body to facilitate an emergency surface maneuver in case the device exceeds a preset depth limit. In such a situation, the planes (fore and aft) may also be set in the full rise position to hasten the system's return to the surface. A tow wire 72 conveys power and provides a communication link to a tow vessel.

Cylinder 60 is composed of two equal halves which, in operation, are forced apart by one or more hydraulic actuators as described above. In another embodiment, the cylinder may be formed of a single shell with a slot along a line substantially parallel to the axis.

Figure 6:
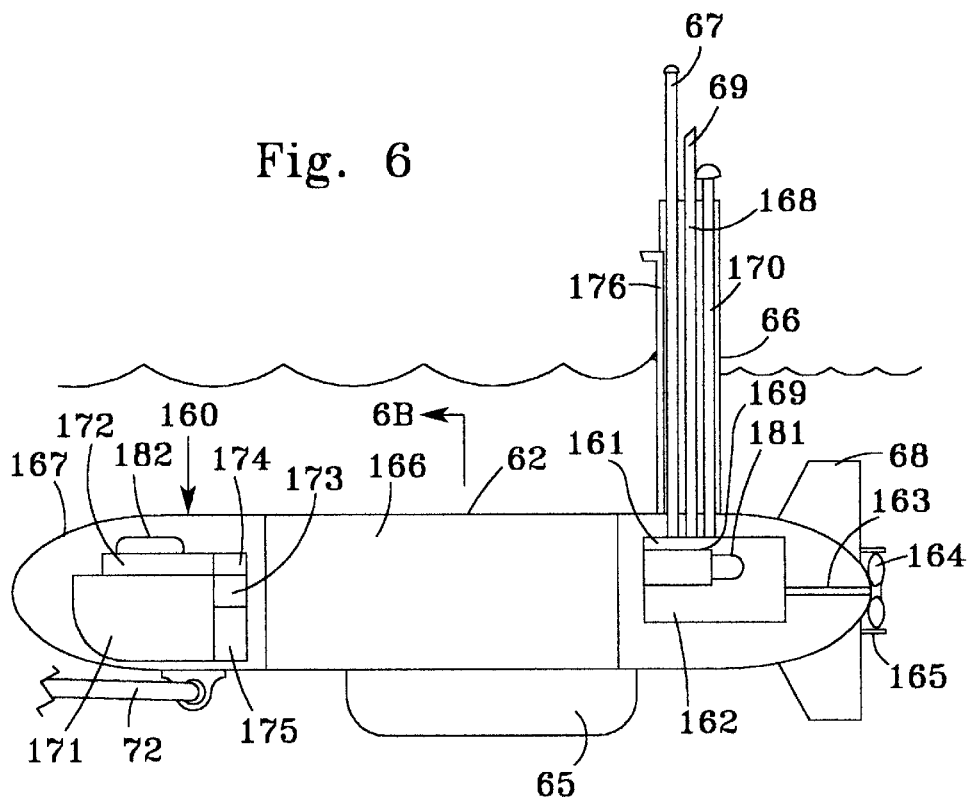
FIG. 6 is a schematic cross-section view of a system according to the present invention.

FIG. 6 discloses another embodiment of the invention wherein system 160 has an internal electric generator 161 that provides vibrator actuator power and power to on-board electronics. An on-board battery 181 provides power to start the motor generator set and can provide back-up power for the electronics. An internal combustion engine 162 provides power to a shaft 163 with a propeller 164 that is mounted in a steering nozzle 165. Appropriate gearing apparatus is used with the engine 162 and shaft 163. A vibrator 166 includes an electrically powered vibrator actuator is mounted within a body 167. An engine fuel intake 176 projects through and from body 167 and is interconnected with a fuel tank 171. An air intake 168 projects through and from the body 167 and is in fluid communication with the engine 162. An exhaust 170 projects through and from the body 167 and is in fluid communication with the compartment 169. The tank 171 contains fuel for the engine 162 and/or ballast for the system 160. In one aspect fuel is contained in a bladder and water for ballast is outside the bladder, or vice-versa. Suitably housed and isolated within the body 167 are vehicle control apparatus 172 which is interconnected with or in communication with the engine 162, rudder 68, and dive planes 64.

Navigation electronics 173 are interconnected with a GPS antenna 181 to determine location, course, and speed in near-real time. Radio modem 174 provides two-way communication between a source vehicle and a control vessel or control site. Communicated information includes navigation data, vehicle status, vehicle commands (e.g. depth, course, speed), source firing time, source signal characteristics, and source status, etc. The vehicle control electronics 172 respond to input data from the navigation electronics 173; on board sensors 182 for depth, roll and pitch; and vehicle command instructions to achieve desired depth, course, and speed or to maneuver as specified by parameters including control parameters, automated dynamic control parameters, or pre-programmed control parameters. Vibrator control 175 controls the operation of the vibrator 166 and includes apparatus for providing electric power to the vibrator actuator.

Figure 7:
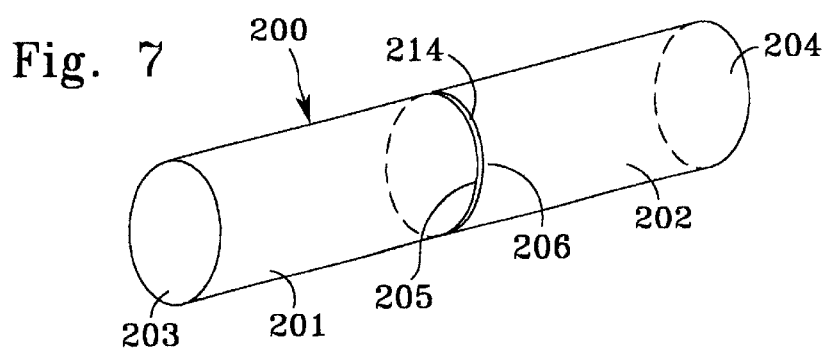
FIG. 7 is a schematic view of a marine vibrator hull according to the present invention.

FIG. 7 is a schematic view of a hull 200 for a marine vibrator according to the present invention. Hull 200 includes two generally cylindrical hollow shells 201, 202 with end covers or caps 203, 204, respectively, which may be sealingly secured to or integrally formed of their respective shells. Ends 205 and 206 abut each other and are appropriately and sealingly secured together, e.g. by any structure and appropriate material. For this purpose a seal connector 214 (like the connector 14, FIG. 1A) is used in the embodiment shown. A marine vibrator with the hull 200 may have any of the aspects and features described above for other embodiments, including, but not limited to, internal and external structures and components and one or more recesses, slots, or portions thereof for mechanically accommodating hull vibration. It is within the scope of this invention to provide a hull like the hull 200, but with three or more shells like the shells 201 and/or 202 positioned end-to-end with a seal connector between adjacent ends.

Figure 8A:
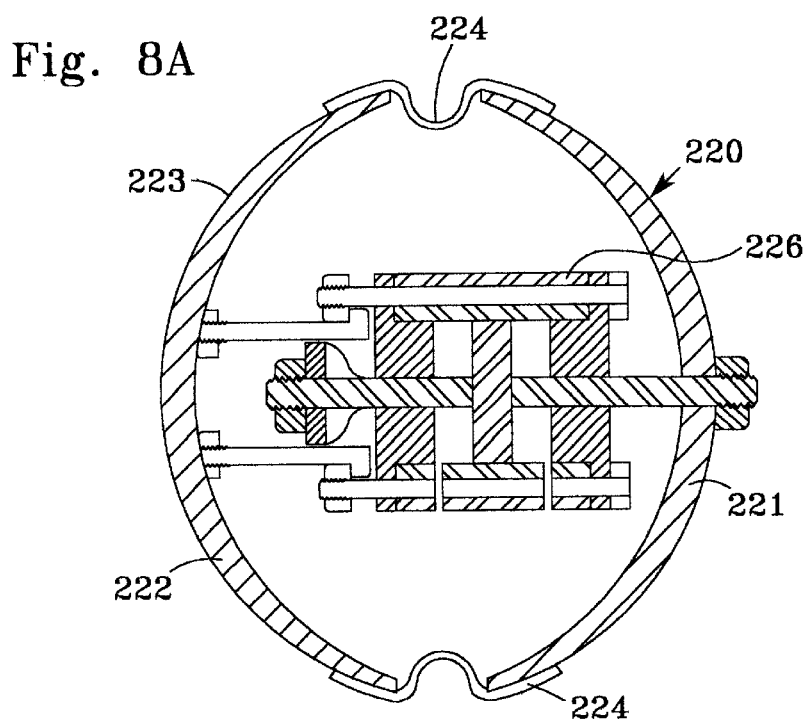
FIG. 8A is a schematic cross-section view of a system according to the present invention.
Figure 8B:
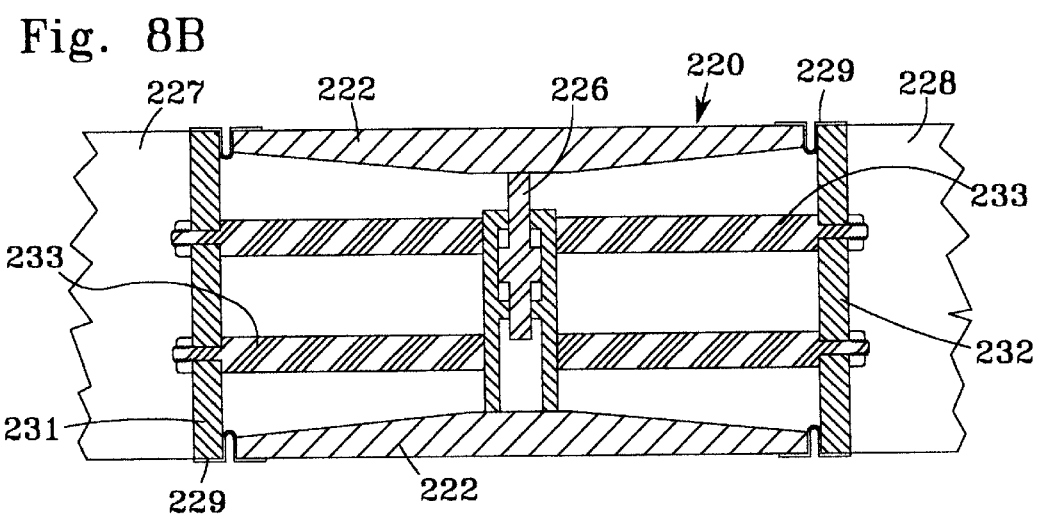
FIG. 8B is another cross-section view of the system of FIG. 8A.

FIGS. 8A and 8B show schematically a marine vibrator 220 according to the present invention which has a shell 223 made of two sub-shells 221 and 222, each of which is generally shaped like half a cylinder. The sub-shells are generally semi-circular in the cross-section shown in FIG. 8A and thicker in the middle than at the upper and lower ends (as viewed in FIG. 8A). A vibrator apparatus 226 (like the vibrator system 16, FIG. 1C) is connected to and between the sub-shells 221, 222. Flexible connectors or sealing gaskets 224 are used between the upper and lower ends of the sub-shells. Preferably, the connectors 224 extend along substantially all the length of the sub-shells.

Unlike the hull 200, which includes two shells, the marine vibrator 200 has three shells 223, 227, 228 each including two sub-shells like the sub-shells 221, 222. Adjacent shells are positioned end-to-end (as are the shells 201, 202, FIG. 7) with a flexible connector 229 therebetween. End plates 231, 232 of the shells 227, 228, respectively, are secured together with braces 233. Preferably the connectors 229 extend around all or substantially all of the interface of adjacent sub-shells.

As shown in FIG. 8B, the sub-shell 222 also tapers from one end to a mid-point (from the inner to thicker) and then from the mid-point to the other end (from thicker to thinner) for increased strength at the thicker portions of the sub-shell.

It is within the scope of this invention for a marine vibrator according to this invention to be self propelled, to be tethered to a host ship for power and control, or to be untethered. In an untethered configuration, the marine vibrator, in certain embodiments, provides its own electric power, all necessary control functions, and propulsion power. Control of speed, direction and depth of the vibrator may be accomplished by remote control from a host ship. The vibrator may be capable of determining its position within a network of radio (including GPS satellites) or acoustic beacons by an on-board system. The vibrator may navigate from one point to another by following a preprogrammed course and speed stored in navigation system memory. The navigation system may be capable of detecting a potential collision with fixed or mobile objects and autonomously initiating maneuvers to avoid a collision.

The invention provides a marine vibrator with a hollow hull formed of at least one shell defining an inner space therein, wherein at least one shell has a streamlined shape for reducing hydrodynamic drag. Vibrator apparatus within the hollow body connected to at least one shell applies force to at least one shell. Such a marine vibrator may also have one or more of the features disclosed herein for other vibrators.

The invention also discloses a marine vibrator with a hollow hull formed of at least one shell defining an inner space therein, at least one shell having a curved shape, propulsion apparatus for propelling the marine vibrator through water, power apparatus within the hull for providing power to the propulsion apparatus, and vibrator apparatus within the hollow hull connected to at least one shell.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A marine vibrator, comprising:
a hollow hull formed of at least one shell defining an inner space therein, wherein at least one shell has a curved shape;
at least one control member on the hull for controlling position of the marine vibrator in water; and
vibrator apparatus within the hollow hull connected to the at least one shell.

2. The marine vibrator of claim 1 wherein at least one control member includes:
movable dive planes on the hollow hull;
a movable rudder on the hollow hull;

a movable elevator on the hollow hull; and control apparatus within the hollow hull for selectively moving the movable dive planes, movable rudder, and movable elevator to thereby control position of the marine vibrator in water.

3. The marine vibrator of claim 1 wherein at least one shell comprises two opposed shells secured together.

4. The marine vibrator of claim 3 wherein the two opposed shells each has an opening defined by a closed curve edge.

5. The marine vibrator of claim 3 wherein said edges are glued together.

6. The marine vibrator of claim 3 wherein said closed curve is an ellipse.

7. The marine vibrator of claim 3 wherein said closed curve is a circle.

8. The marine vibrator of claim 3 wherein the two opposed shells are identical.

9. The marine vibrator of claim 1 wherein the inner space is filled with gas under pressure.

10. The marine vibrator of claim 9 wherein the gas is from the group consisting of air, nitroge, and a mixture thereof.

11. The marine vibrator of claim 3 wherein the vibrator apparatus is connected directly to said opposed shells.

12. The marine vibrator of claim 1 wherein the at least one shell is at least partially lined with lining material and reinforced with reinforcing members.

13. The marine vibrator of claim 1 wherein the vibrator apparatus is for applying equal and opposite forces to at least one shell.

14. The marine vibrator of claim 4 wherein the closed curves have a diameter in a horizontal plane coincident with a direction of towing of the marine vibrator, the marine vibrator has a height, and the ratio of said vibrator height to said diameter is 1.0 or less.

15. The marine vibrator of claim 14 wherein said ratio is less than 0.5.

16. The marine vibrator of claim 1 further comprising control apparatus within the hollow hull for selectively moving the at least one control member to thereby control position of the marine vibrator in water.

17. The marine vibrator of claim 16 wherein said control apparatus includes remotely operable apparatus for remote control of the marine vibrator.

18. The marine vibrator of claim 1 further comprising propulsion apparatus for propelling the marine vibrator through water.

19. The marine vibrator of claim 18 further comprising power apparatus within the hollow hull for providing power to the propulsion apparatus.

20. The marine vibrator of claim 3 wherein the shells have a combined outer surface area, the marine vibrator projects a projected area which is a cross-sectional area onto a plane normal to a direction of advance of the marine vibrator, and a ratio of said combined outer surface area to said projected area is 0.5 or less.

21. The marine vibrator of claim 1 further comprising a weighted keel secured to the hollow hull.

22. The marine vibrator of claim 1 wherein at least one shell is streamlined to reduce hydrodynamic drag.

23. The marine vibrator of claim 3 further comprising a flexible seal between and connecting the two opposed shells.

24. A marine vibrator comprising:
  a hollow hull formed of at least one shell having an interior surface and defining an inner space therein; and
  vibrator apparatus within the hollow hull connected directly to at least one shell.

25. A marine vibrator comprising;
  a hollow hull formed of at least one shell defining an inner space therein wherein said shell has a streamlined shape for reducing hydrodynamic drag; and
  vibrator apparatus within the hollow body connected to at least one shell, the vibrator apparatus for applying force to at least one shell.

26. The marine vibrator of claim 25 wherein at least one shell is two opposed shells secured together, and wherein the closed curve has a diameter in a vertical plane coincident with a direction of towing, the marine vibrator has a height, and the ratio of the height to said diameter is less than 1.0.

27. The marine vibrator of claim 26 wherein said ratio is less than 0.5.

28. The marine vibrator of claim 25 wherein at least one shell is two opposed shells secured together, the shells have a combined outer surface area, the marine vibrator projects a projected area which is a cross-sectional area onto a plane normal to a direction of advance of the marine vibrator, and a ratio of said combined outer surface area to said projected area is 0.5 or less.

29. A marine vibrator comprising:
  a hollow hull formed of at least one shell defining an inner space therein;
  at least one shell having a curved shape;
  propulsion apparatus for propelling the marine vibrator through water;
  power apparatus within the hull for providing power to the propulsion apparatus; and
  vibrator apparatus within the hollow hull connected to at least one shell.

30. The marine vibrator of claim 29, further comprising;
  control apparatus within the hollow hull for selectively controlling at least one control member to thereby control position of the marine vibrator in water.

31. The marine vibrator of claim 30 wherein the control apparatus includes remotely operable apparatus for remote control of the marine vibrator.

32. A method for insonifying earth under water, the method comprising:
  positioning a marine vibrator in the water, the marine vibrator comprising a hollow hull formed of at least one shell defining an inner space therein, at least one shell having a curved shape, at least one control member on the hull for controlling position of the marine vibrator in water, and vibrator apparatus within the hollow hull connected to at least one shell; and
  vibrating the hollow hull with the vibrator apparatus to produce a sound wave for reflection from the earth.

33. A method for insonifying earth under water, the method comprising
  positioning a marine vibrator in the water, the marine vibrator comprising a hollow hull formed of at least one shell having an interior surface and defining an inner space therein, vibrator apparatus within the hollow hull connected directly to at least one shell; and
  vibrating the hollow hull with the vibrator apparatus to produce a sound wave for reflection from the earth.

34. A method for insonifying earth under water, the method comprising:
  positioning a marine vibrator in the water, the marine vibrator comprising a hollow hull formed of at least one shell defining an inner space therein, at least one shell having a streamlined shape for reducing hydrodynamic drag, and vibrator apparatus within the hollow body connected to at least one shell, the vibrator apparatus for applying force to at least one shell; and vibrating the hollow hull with the vibrator apparatus to produce a sound wave for reflection from the earth.

35. A method for insonifying earth under water, the method comprising:

positioning a marine vibrator in the water, the marine vibrator comprising a hollow hull formed of at least one shell defining an inner space therein, at least one shell having a curved shape, propulsion apparatus for propelling the marine vibrator through water, power apparatus within the hull for providing power to the propulsion apparatus, and vibrator apparatus within the hollow hull connected to at least one shell; and vibrating the hollow hull with the vibrator apparatus to produce a sound wave for reflection from the earth.

* * * * *